(12) United States Patent
Marchand et al.

(10) Patent No.: US 6,782,083 B2
(45) Date of Patent: Aug. 24, 2004

(54) ISN CALL INTERRUPT

(75) Inventors: Dean C. Marchand, Brighton, CO (US); Arthur Lance Springer, Waterloo, IA (US); Jeffrey D. Cahill, Highlands Ranch, CO (US); David K. Vognsen, Cedar Rapids, IA (US)

(73) Assignee: MCI, Inc., Ashburn, VA (US)

( * ) Notice: Subject to any disclaimer, the term of this patent is extended or adjusted under 35 U.S.C. 154(b) by 70 days.

(21) Appl. No.: 09/875,091

(22) Filed: Jun. 6, 2001

(65) Prior Publication Data

US 2002/0191767 A1 Dec. 19, 2002

(51) Int. Cl.⁷ .............................................. H04M 15/00
(52) U.S. Cl. .............................. 379/114.14; 379/114.29
(58) Field of Search ....................... 379/114.14, 114.25, 379/114.29, 115.01, 115.02, 189, 145, 126, 111

(56) References Cited

U.S. PATENT DOCUMENTS

| | | | |
|---|---|---|---|
| 5,357,564 A | | 10/1994 | Gupta et al. |
| 5,463,681 A | * | 10/1995 | Vaios et al. .................. 379/189 |
| 5,566,234 A | * | 10/1996 | Reed et al. .................. 379/188 |
| 5,627,886 A | | 5/1997 | Bowman |
| 5,768,354 A | * | 6/1998 | Lange et al. ................. 379/189 |
| 5,802,156 A | | 9/1998 | Felger |
| 5,970,134 A | * | 10/1999 | Highland et al. ....... 379/265.01 |
| 6,307,926 B1 | * | 10/2001 | Barton et al. ................ 379/189 |
| 6,442,265 B1 | * | 8/2002 | Harlow et al. ............... 379/189 |

* cited by examiner

*Primary Examiner*—Curtis Kuntz
*Assistant Examiner*—Barry W Taylor

(57) ABSTRACT

A device and method of intercepting in-progress calls whose billing numbers have been marked fraudulent subsequent to the initial authorization and validation of the same in-progress calls. The device and method uses criteria to define certain calls as "suspect" and parks all suspect calls after the initial call processing. Because the suspect calls are parked and not released to the general switching elements of the telephone network, the suspect calls can be torn down if the associated billing number is marked fraudulent after call processing. The criteria can maintain a fine granularity by using various Call Park Flags in various databases. In addition, the suspect calls can remain parked for varying amounts of time based on the category and type of call.

26 Claims, 5 Drawing Sheets

ISN CALL INTERRUPT

BACKGROUND

1. Technological Field

The present application relates generally to telecommunications and, in particular, to a method for tearing down in progress special service calls which have been validated and authorized, but have been subsequently found to be fraudulent.

2. Description of the Related Art

The telecommunications industry has experienced significant changes in the way that customers are billed for their telephone calls. From the once simple method of billing the originating caller, many methods have been developed, allowing greater flexibility for the telecommunications customer. A predominant method for making telephone calls away from home or the office is by utilizing the telephone calling card to charge the call.

Calling card customers may use any telephone facility, including public facilities, to make a call that will be charged to their account. The process of making calls using a calling card typically includes dialing an "800" number, waiting for an audio prompt, and then entering an account number and a Personal Identification Number (PIN) into a telephone key pad device. The "800" (and now "888") number phone calls are one type of a category of phone calls called "special service" calls. These special service calls, which include "700", "800/888", and "900" number calls, allow contemporary telecommunications networks to provide many services beyond direct distance dialing. It is the long distance carriers that provide this special service call processing, which allows for toll-free calls, calling card calls, special rate calls, etc.

Following the example of a calling card call, once the account number and PIN have been entered, the calling card customer can make one or more calls from whatever location the customer is dialing in from. These calls are subsequently charged to the customer's calling card account. Calling cards can also be used to avoid having to pay additional surcharges when making calls from certain public facilities such as hotels and telephone booths.

As with many new technologies, the ease and flexibility of the use of calling cards has led to abuse, and has consequently brought about new types of fraud. Calling card fraud costs businesses (and consumers) millions of dollars annually. Current security mechanisms, while effective, are not fail-safe, and protection mechanisms for consumers and businesses require improvement to stem these fraud-related losses.

There is a virtual underground industry in stolen calling cards and authorization codes. The multitude of ways that calling cards and authorization numbers find their way into unscrupulous hands need not be discussed here, but suffice it to say there is no end to the ingenuity of the criminal mind. One example of calling card fraud is the technique of "surfing" banks of public telephones, such as are at airports. Criminals "surf" by looking over the shoulders of legitimate card users as they key in the account number and PIN. Then they sell or distribute these numbers and rampant fraud results. In some cases, a single account may incur charges in excess of $100,000 in a single weekend. Calling card fraud and other forms of fraudulent use present pervasive problems for telephone carriers, particularly long distance carriers.

One method of fraud control is to simply remove calling card numbers against which it is suspected that fraudulent calls are being charged. In order to recognize fraudulent calls, a "billing number"—a billing product and an account number, such as a calling card, pre-paid phone card, etc.—is monitored over time. For example, where the number of domestic calls placed within a certain amount of time using the same billing number exceeds a certain threshold, an alert is generated. International calls may have a lower threshold so that fewer calls within the time period generate an alert. In addition, the threshold may be further adjusted for calls to countries where a high percentage of fraudulent calls are directed.

When a threshold alert is generated, it is typically sent to a fraud analyst. A fraud analyst would be stationed at a fraud control console 158, as shown in FIG. 1. The fraud analyst analyzes the alert and the history of that billing number in order to determine whether or not to deactivate that billing number. The fraud analyst may attempt to contact the calling card user in order to resolve the issue. If the fraud analyst decides that the calling card is being used fraudulently, he sets a "fraud flag" which indicates that subsequent calls using this billing number should be blocked or intercepted. When the fraud flag is set, the billing number is flagged in the Billing Number Screening (BNS) server 160 in FIG. 1. This whole process may be automated so that a fraud analyst is not needed to actually flag a billing number. Because of this, the term "fraud control console" or "fraud control" will be used herein to signify either a console operated by a fraud analyst or an automated process.

An example of a conventional calling card call is shown with reference to FIG. 1. The caller, using telephone 111, makes a calling card call by dialing a number in the format of 1-800-NXX-XXXX. The call is routed through Local Exchange Carrier (LEC) 110. LEC refers to local telephone companies, such as the Regional Bell Operating Companies (RBOCs), which provide local transmission services for their customers. Because of the 1-800 format of the dialed number, the routers in the LEC will forward the call to the network of the appropriate long distance carrier (or Inter-Exchange Carrier IXC) 100. Special service telephone calls, such as "800" number calls, are provided by IXCs, such as MCI-Worldcom. After switching through LEC switches 112 and 114, the "800" number is routed into the IXC 100 to a bridge switch 102. The purpose of the bridge switch 102 is to receive calls from the IXC network and bridge them to the Automatic Call Distributor (ACD) 106 and, ultimately, into the Intelligent Services Network platform (ISN) 150. There are a number of ISNs within the IXC, but, for the purpose of understanding the present invention, one ISN will suffice.

The ACD 106 is under the direct control of the Application Processor APP 156, which is a general purpose computer that functions as the central point for call routing control in the ISN 150. When the "800" number call arrives at the ACD 106, the ACD 106 makes a request to the APP 156 for directions as to how the call should be handled. Such a request would usually be accompanied by information concerning the call; i.e. the Automatic Number Identification (ANI) of the caller and the destination number of the call. The APP 156 would recognize by the "800" prefix of the destination number that the call is a special services call and, consequently, the APP 156 would instruct the ACD 106 to deliver the call to the appropriate queue. In this case, assuming that the call is to a calling card "800" number, the call would queue up to the Automatic Response Unit (ARU) 152. The ARU 152 comprises two components, one to process the call, the other to prompt the caller with a voice response system. It is the ARU 152 that will ask the caller for the required final destination number, calling card number, and PIN. When a live operator is required, the call is routed to the Manual Telecommunications Operator Console (MTOC) 154. Whether the call is routed to the ARU 152 or the MTOC 154, the same informational decisions will have to be made. In other words, regardless of whether it is entered by the operator at the MTOC 154 or by the caller at her telephone 111 to the ARU 152, the calling card account number will have to be entered.

During the course of servicing a call, the need often arises to "park" a call on the ACD 106. When a call is parked on the ACD 106, the call is active, i.e., there is a party on the call with an established voice channel connected to the ACD 106. The call is monitored and maintained at the ACD. Once a call is parked at the ACD, it is no longer under direct control of either the ARU 152 or the MTOC 154 that parked the call. This allows the facilities at the ISN 150 to be freed up to perform other tasks or services. A Call Park Server (CPS) 170 monitors calls parked on the ACD 106 by maintaining a relational database. Information concerning the status of calls parked on the ACD 106 is sent to the CPS 170.

When the caller enters her account number and PIN, the ISN 150 checks the billing number associated with that account in the BNS 160. If the billing number is flagged, the call may be re-routed to an MTOC 154, a fraud analyst at a fraud console 158, or simply disconnected. If the billing number is not flagged in the BNS 160, the call processing will continue. For example, if the destination number was outside the country, various databases, such as an Exchange Master database (X-MASTER) 162, an International Country Code database (INTERNAT'L COUNTRY) 164, an International City Code database (INTERNAT'L CITY) 166, would be referred to in order to effectively route and bill the call. Once the call processing is complete, and the call has been completely authorized and validated, the connection is released back to the bridging switch 102 and the switching elements of the IXC 100. The call exits the IXC network 100 and enters LEC 190, where it is switched through LEC switches 192 and 194 before connecting with telephone unit 199.

This method is effective in eliminating fraudulent calls made by calling cards that have already been recognized as fraudulent. However, this conventional method is ineffective in stopping calls that are already in progress. This is because, after a call has been authorized and validated, its connections are released to the automated switching of the IXC 100, where they can not be retraced. Thus, when a fraud console 158 flags a billing number in the BNS 160, the calls associated with that billing number that are already in progress are unaffected, because the connections cannot be easily traced in the automated switching of the IXC 100. Although future calls will be effectively blocked, all in-progress calls will continue unaffected.

Although the costs associated with in-progress fraudulent calls may seem a minor problem, they are not. Many fraudulent calls, particularly ones to international numbers, last for many hours. As an example of the costs involved, let's suppose an IXC loses an estimated $33 million to calling card fraud. For international fraudulent calls, the IXC incurs actual LEC expenses for the fraudulent calls, not merely lost revenues. So, out of the $33 million, let us further suppose an estimated 38%, or $12 million, is out of pocket expenses. If just the in-progress international fraudulent calls were eliminated, at least 10% of that $12 million, or $1.2 million, would be saved.

Therefore, there is a need to eliminate in-progress fraudulent calls, or, more precisely, calls that were previously authorized and validated, but whose billing numbers have been subsequently flagged.

SUMMARY

One object of this invention is to provide a system and method of blocking in-progress fraudulent calls in a telecommunications system.

Another object of this invention is to provide a system and a method for intercepting in-progress fraudulent calls at an ISN in a telecommunications system.

An additional object of the present invention is to temporarily park suspected calls at an ISN, so that, if the billing number for one of the suspected calls is flagged, the in-progress fraudulent call may be torn down.

To accomplish the above and other objects, a system and method for interrupting calls at the ISN is provided which uses established criteria to determine which calls are suspect, monitors calls being processed at an ISN to determine which are suspect, and parks suspect calls at the ACD. Records concerning the suspect calls parked at the ACD and containing the billing numbers associated with the suspect calls are kept at the CPS. Although other means for selecting a suspect call may be used, the preferred embodiment uses Call Park Flags in the International Country Code Database, the International City Code Database, and the Exchange Master Database to select which calls are suspect. The suspect calls do not remain parked at the ACD indefinitely, but are released to the network after a predetermined amount of time. The predetermined amount of time varies according to the category and type of call.

When a billing number is flagged as fraudulent at the BNS, a teardown request is generated. The billing number in the teardown request is compared with the billing numbers in the records of the CPS. If there is a match, the ACD is directed to tear down any calls associated with the CPS record.

BRIEF DESCRIPTION OF THE FIGURES

The foregoing and other objects, aspects and advantages will be better understood from the following detailed description of a preferred embodiment as illustrated in the following drawings. In the drawings, like reference numbers indicate identical or functionally similar elements.

DETAILED DESCRIPTION OF THE PREFERRED EMBODIMENTS

Figure 1:
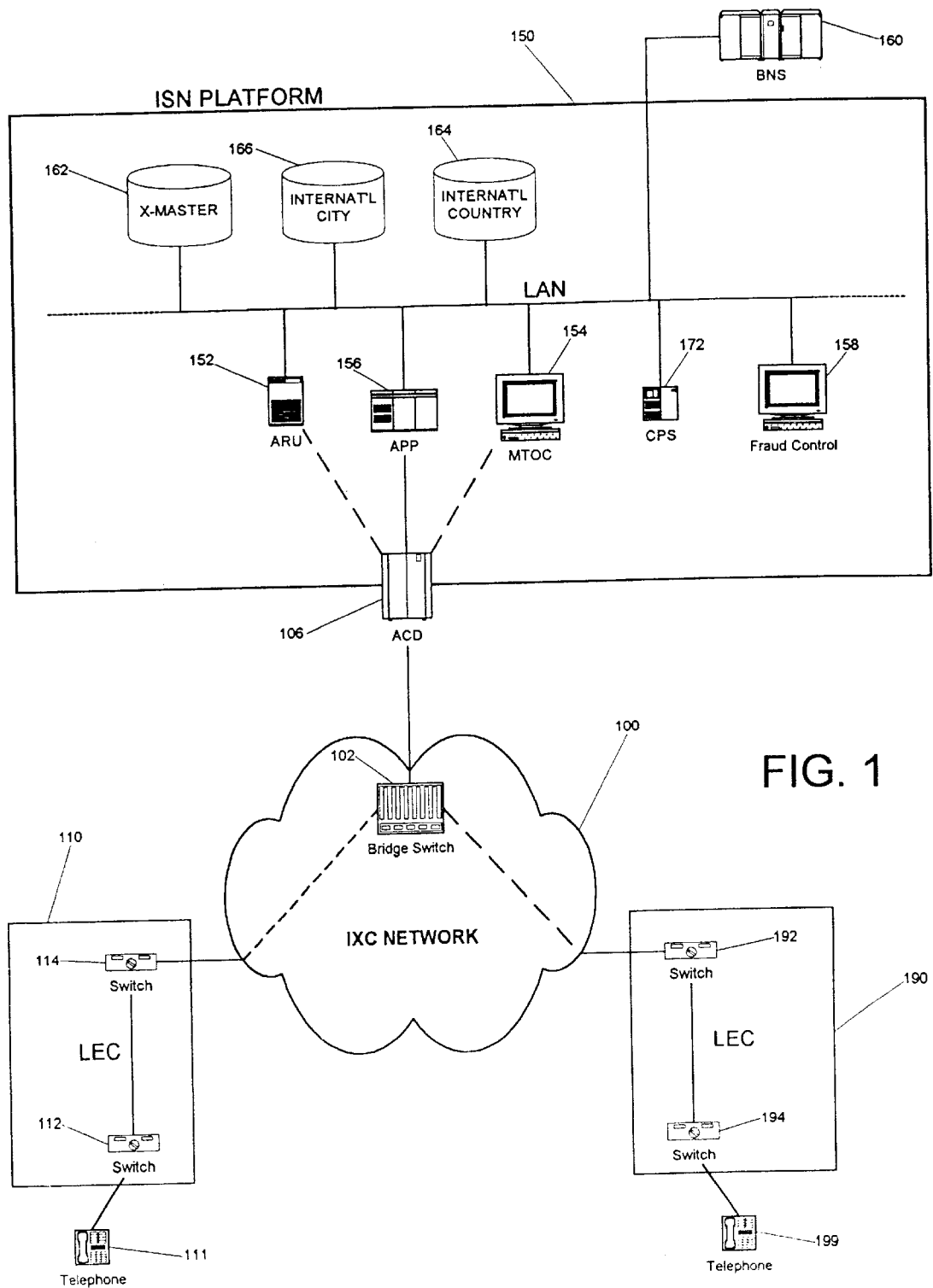
FIG. 1 is a schematic diagram of a telephone system according to the prior art.

In the following description, the term "network" is a short-hand description of the conglomeration of databases, trunk and telephone lines, routers, switches, protocols, and computers that are required to make a telecommunications network.

In short, the preferred embodiment of the present invention parks suspected calls in the ACD of an ISN, so that if the associated billing number for a suspected call is subsequently found to be fraudulent, the call may be torn down. In the preferred embodiment, certain international originating nature of addresses (NOAs) and international destinations will automatically place a call in a suspect class; however, these should be understood as examples of qualifications for being a suspect phone call, not a complete list. Other qualifications, such as certain originating ANIs or an already suspicious billing number, could be used to define a suspect phone call. For the rest of this description, only the qualification of international origins or destinations will be used.

In addition, in the description of the preferred embodiment, the various steps made, and databases contacted, are not meant to be an exhaustive list of the steps made and databases contacted in order to fully validate a call. For instance, only a single BNS will be described, although an IXC may have a large centralized BNS which updates smaller BNSs that are maintained in individual ISNs. Furthermore, other databases or systems that are involved in the setting up of a call, such as a Line Information Database (LIDB) or a Service Management System (SMS), have been left out as irrelevant to the description of the present ISN Call Intercept system and method. These and other details, which would be obvious to one skilled in the art, are not provided, in order not to obscure the invention in details unnecessary for the understanding of the present invention.

There are two sides to a successful implementation of the preferred embodiment of the present invention. First, an incoming special services call must be recognized as suspect and parked. Second, when the BNS is updated with a newly flagged billing number, any suspect calls associated with that billing number must be torn down.

The suspect recognition procedure will be discussed first. As mentioned above, the preliminary conditions that will make a calling card call suspect are if the originating leg of the call is an international number or the terminating leg of the call is an international number. However, these preliminary conditions only invoke the call park logic, and will not result in the call always being parked. It is only particular originating ANIs, originating exchanges, and destinations that will cause the call to be parked.

Various "Call Park Flags" in the databases control whether a particular originating number, destination number, exchange or combination will park a call. The new flags used in the preferred embodiment are shown in Table 1. For the two International databases, there are two flags, which indicate different levels of suspicion concerning the international country or city involved. In both cases, if Call Park Flag #1 is "Y", then the call is automatically parked. However, if Call Park Flag #2 is "Y", the call will be parked only if the other leg of the call is flagged. The flag on the other leg may be any of the five Call Park Flags. The default setting is "N", and only one of a pair (Call Park Flag #1 and Call Park Flag #2) may be "Y". The Call Interrupt Flag of the Exchange Master Database indicates whether a certain exchange is suspect, but will only cause a call to be parked if there is a flag on the other leg of the call.

TABLE 1

| Database | Park Flags | Function |
| --- | --- | --- |
| International Country Code Database | International Country Call Park Flag #1 (COUNTRY#1) | Call will be sent to Call Park Server |
| | International Country Call Park Flag #2 (COUNTRY#2) | If the other leg of the call is flagged, the call will be sent to the Call Park Server |
| Exchange Master Database | Call Interrupt Flag (INTERRUPT) | If either leg of the call is flagged, the call will be sent to the Call Park Server |
| International City Code Database | International City Call Park Flag #1 (CITY#1) | Call will be sent to Call Park Server |
| | International Country Call Park Flag #2 (CITY#2) | If the other leg of the call is flagged, the call will be sent to the Call Park Server |

As seen by the various combinations of flags in Table 1, the present invention allows many layers of fine-tuning the conditions under which a call is suspect and should be parked. Any of the databases associated with routing a calling card call could have Call Park Flags added to indicate suspect calls. A Fraud Analyst or an automated fraud program would mark the Call Park Flags of the various databases based on statistical data and other factors. Although the simplified labels "COUNTRY", "CITY", and "INTERRUPT" are used in this description, the actual labels would be much more complicated in order to differentiate them from the other data fields and flags in the three databases.

Figure 2:
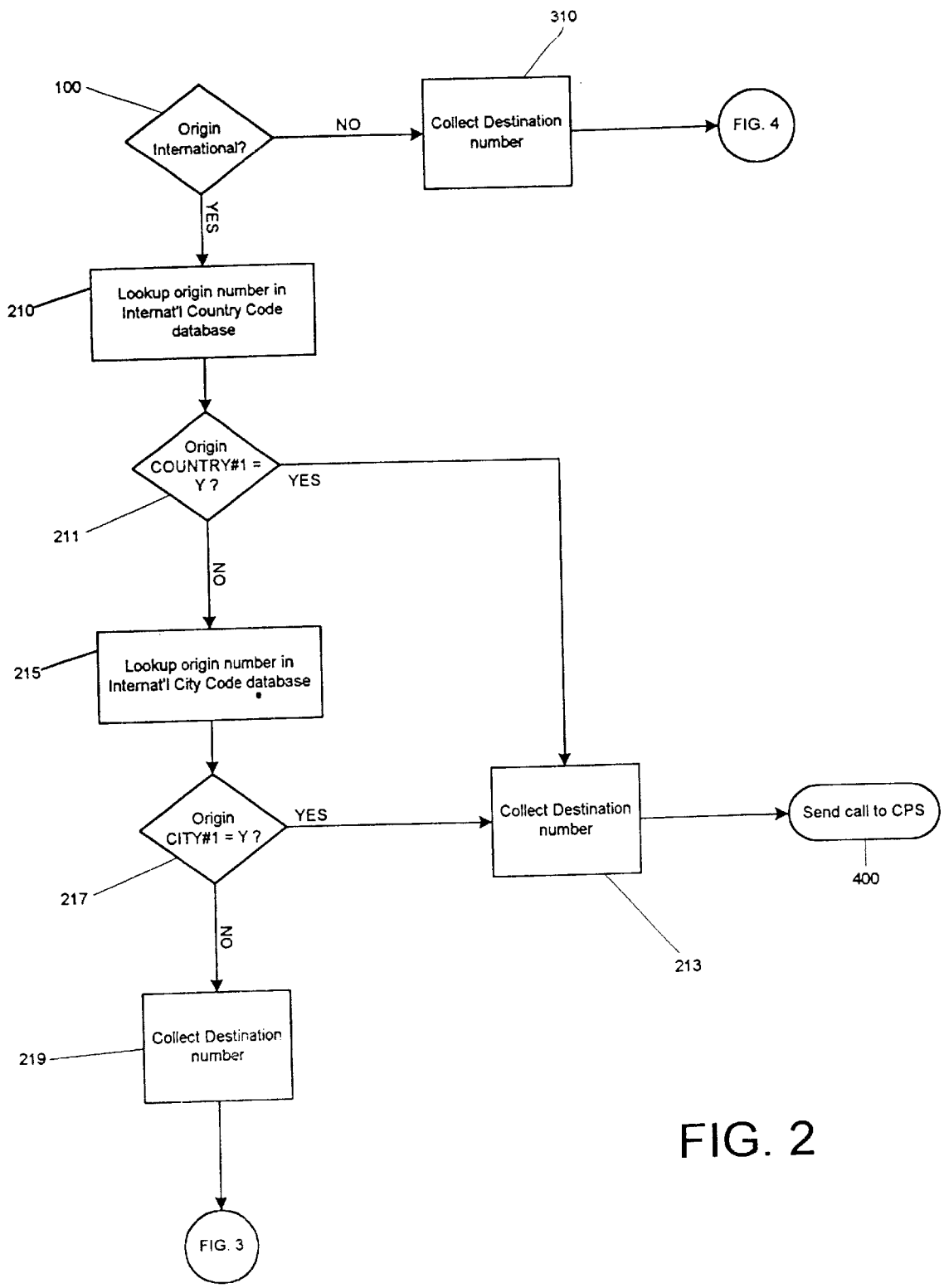
FIG. 2 is an exemplary flowchart of the beginning steps of determining whether a call matches established criteria, according to a preferred embodiment of the present invention.

The suspect recognition procedure using the Call Park Flags from Table 1 will be discussed with reference to FIGS. 2, 3 and 4. In the preferred embodiment, the call processing steps are the same as described in the background until reaching the point after the BNS 160 has been checked. At this point, the originating leg of the call is connected through the ACD, but the terminating leg has not been connected. Now as shown in FIG. 2, the suspect recognition procedure checks to see if the originating leg of the call is international in step 100. In the following description, the steps following after the originating leg is determined to be international are labeled with identifying numerals beginning with the number 2, i.e., 2XX, and the steps following the determination that the originating leg is not international are labeled with identifying numerals beginning with the number 3, i.e., 3XX. When the originating leg is not international, the call destination number is collected in step 310 and the procedure jumps to step 320 in FIG. 4, which will be described below.

If the originating leg is international in step 100, the originating number is looked up in the International Country Code Database in step 210, and it is determined whether the origin COUNTRY#1=Y in step 211. If COUNTRY#1=Y in step 211, the destination number is collected in step 213, and the call is sent to the Call Park Server CPS in step 400. If COUNTRY#1=N in step 211, the originating number is looked up in the International City Code Database in step 215, and it is determined whether the origin CITY#1=Y in step 217. If origin CITY#1=Y in step 217, the destination number is collected in step 213, and the call is sent to the Call Park Server CPS in step 400. If CITY#1=N in step 217, the destination number is collected in step 219.

Figure 3:
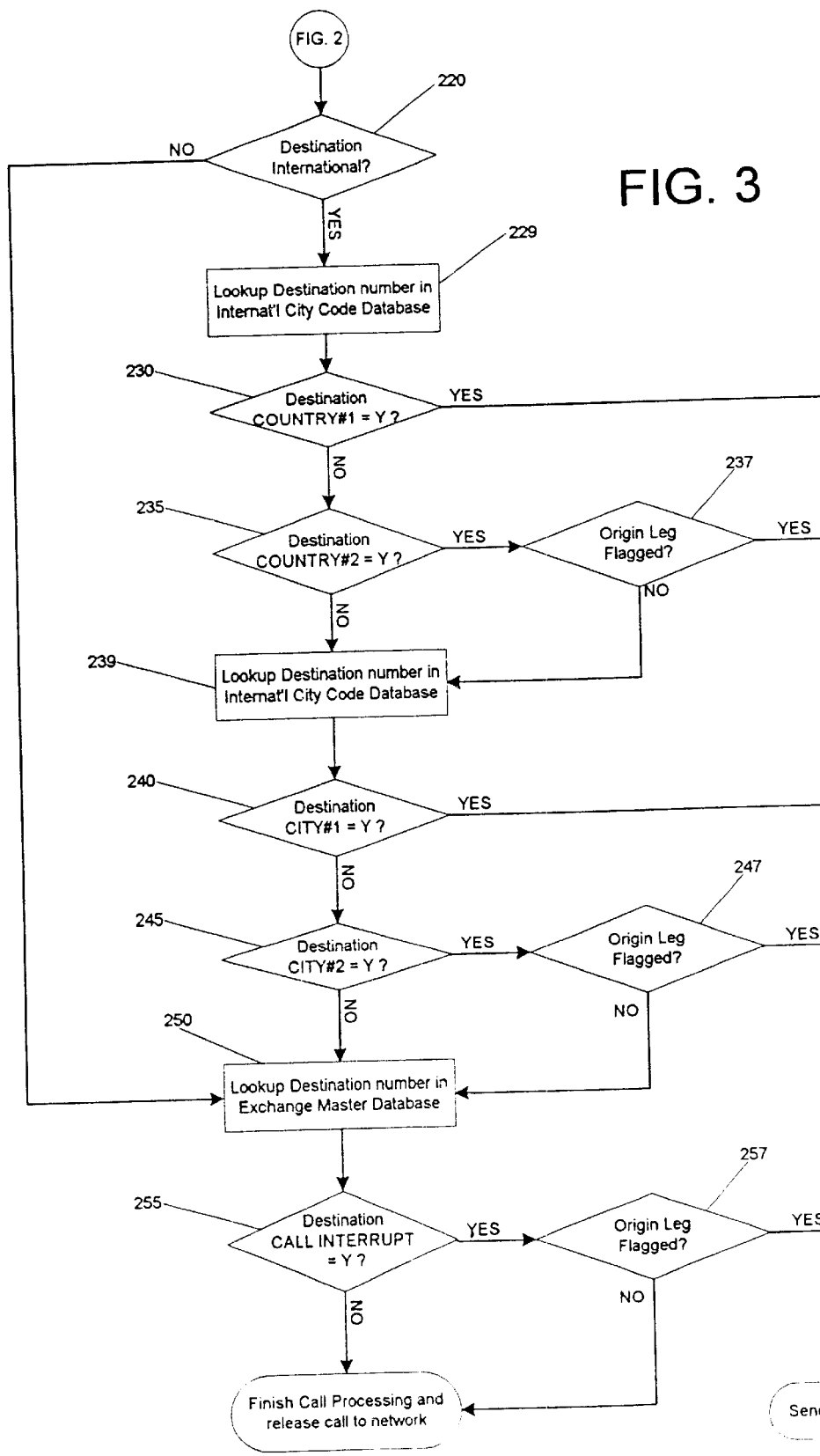
FIG. 3 is an exemplary flowchart of the steps of determining whether a call matches established criteria, after it is determined that the originating leg of the call is international in FIG. 2, according to the preferred embodiment of the present invention.

After step 219, the procedure continues as shown in FIG. 3 at step 220, where it is determined if the destination is international. If it is, the destination number is looked up in the International Country Code Database at step 229. If it is not, the process jumps to step 250 where the destination number is looked up in the Exchange Master Database.

If the destination is international at step 220, it is determined whether the destination COUNTRY#1=Y in 230 after looking it up in step 229. If the destination COUNTRY#1=Y, the call is sent to the CPS at step 400. If the destination COUNTRY#1=N, it is determined whether the destination COUNTRY#2=Y in step 235. If COUNTRY#2=Y, it is determined whether the origin leg is flagged in step 237. In the origin leg flag check step, if any of 1) the origin COUNTRY#2, 2) the origin CITY#2, or 3) the origin CALL INTERRUPT=Y, the process continues on the "YES" arrow. If not, the process continues on the "NO" arrow. If the origin flag check step 237 is "Y", the call is sent to the CPS in step 400. If either the destination COUNTRY#2 in step 235 or the origin flag check in step 237 are "N", the destination number is looked up in the International City Code Database in step 239. After the lookup in step 239, it is determined whether the destination CITY#1=Y in step 240. If it is, the call is sent to the CPS in step 400. If the destination CITY#1=N in step 240, it is determined whether the destination CITY#2=Y in step 245. If the destination CITY#2=Y in step 245, it is determined whether the origin leg is flagged in step 247. If the origin leg is flagged in step 247, the call is sent to the CPS in step 400.

If any of the destination CITY#2=N in step 245, the origin leg flag check is "N" in step 247, or the destination number is not international in step 220, the process continues at step 250. In step 250, the front prefix of the destination number (the "NPA-NXX" in telephone number "NPA-NXX-XXXX") is looked up in the Exchange Master Database. Then it is determined whether the CALL INTERRUPT=Y for that exchange in step 255. If it does not, the call is processed and released to the network. If the CALL INTERRUPT=Y for the exchange in step 255, it is determined whether the origin leg is flagged in step 257. If the origin leg is flagged in step 257, the call is sent to the CPS in step 400. If the origin leg is not flagged in step 257 or the destination CALL INTERRUPT=N in step 255, the call is processed and released to the network.

This completes the description of the steps following a determination that the originating leg was international. Below, the steps 3XX following a determination that the originating leg is not international are described.

Figure 4:
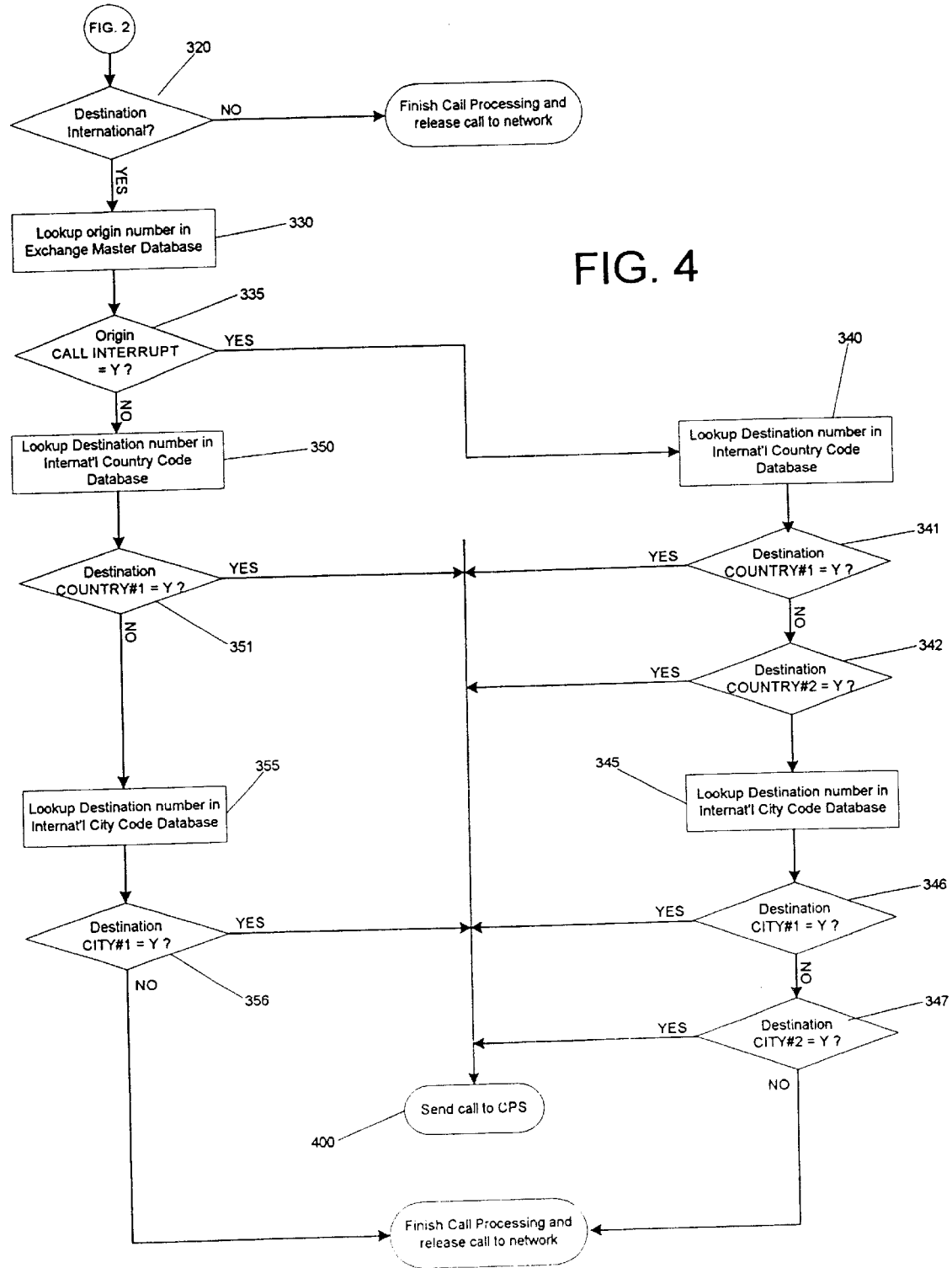
FIG. 4 is an exemplary flowchart of the steps of determining whether a call matches established criteria, after it is determined that the originating leg of the call is not international in FIG. 2, according to the preferred embodiment of the present invention.

After step 310, where the destination number was collected, in FIG. 2, it is determined, in step 320 of FIG. 4, whether the destination number is international. If the destination number is not international, the call is processed and released to the network. If the destination number is international in step 320, the front prefix of the origin number (the "NPA-NXX" in telephone number "NPA-NXX-XXXX") is looked up in the Exchange Master Database in step 330. Then, it is determined whether CALL INTERRUPT=Y for that origin exchange in step 335. If CALL INTERRUPT=Y in step 335, the procedure continues through steps 340 to 347. If CALL INTERRUPT=N in step 335, the procedure continues through steps 350 to 356.

If CALL INTERRUPT=N in step 335, the destination number is looked up in the International Country Code Database in step 350. Next, in step 351, it is determined whether destination COUNTRY#1=Y. If it does, the call is sent to the CPS at step 400. If the destination COUNTRY#1=N, the destination number is looked up in the International City Code Database at step 355. It is determined whether CITY#1=Y in step 356. If CITY#1=Y, the call is sent to the CPS. If CITY#1=N in step 356, the call is processed and released to the network.

If CALL INTERRUPT=Y in step 335, the destination number is looked up in the International Country Code Database in step 340. Next, in step 341, it is determined whether destination COUNTRY#1=Y. If it does, the call is sent to the CPS at step 400. If the destination COUNTRY#1=N, it is determined whether destination COUNTRY#2=Y in step 342. If it does, the call is sent to the CPS at step 400. If the destination COUNTRY#2=N in step 342, the destination number is looked up in the International City Code Database at step 345. It is determined whether destination CITY#1=Y in step 346. If destination CITY#1=Y, the call is sent to the CPS. If destination CITY#1=N in step 346, it is determined whether destination CITY#2=Y in step 347. If it does, the call is sent to the CPS at step 400. If CITY#2=N in step 347, the call is processed and released to the network.

In the preferred embodiment, these steps are performed by either the ARU or the MTOC. After it is determined that a call needs to be sent to the CPS, the terminating leg of the call needs to be conferenced in so that the entire call is parked. When the entire call is parked on the ACD and a record of it, with the associated billing number, is stored in the CPS, the ARU or MTOC will be released from the call. After a predetermined amount of time, the suspect call will be released from the ACD, so that the ACD does not become saturated with suspect calls. In the preferred embodiment, the default predetermined amount of time is 999 seconds or 16.5 minutes.

The teardown process will now be discussed with reference to FIG. 5.

Figure 5:
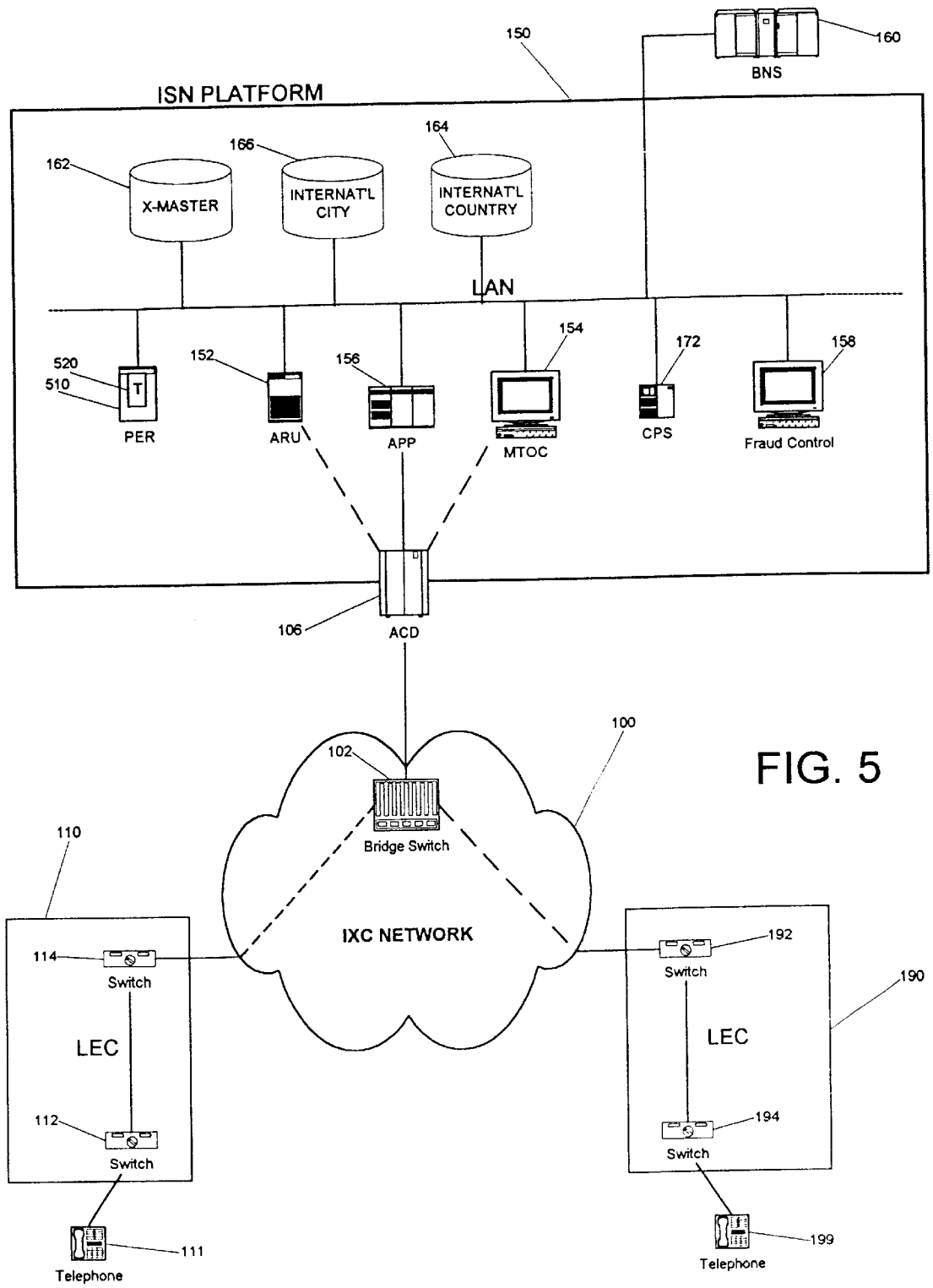
FIG. 5 is a schematic diagram of a telephone system according to the preferred embodiment of the present invention.

FIG. 5 is a schematic diagram of a telephone system according to the preferred embodiment of the present invention. In the preferred embodiment, fraud control is responsible for tearing down any fraudulent call that is in progress. Fraud control uses the BNS to block a billing number. Therefore, in the preferred embodiment, the BNS is modified so that, when fraud control determines that a billing number is fraudulent and adjusts the BNS accordingly, a teardown request will be sent to the CPS. The CPS will check its records for that billing number and, if that billing number is associated with any of the suspect calls parked at the ACD, the CPS will direct the ACD to tear down both legs of the call. In the preferred embodiment, a log is maintained of each teardown request. In addition, a new Permissions Database (PER) 510 is added. The Permissions Database 510 contains a list of billing category/call type combinations to which the call logic of FIGS. 2, 3, and 4 are applied. If a call fits one of the billing categories, call types, or combination of the two, the call will be put through the call park logic. If not, the call park logic is not implemented, resulting in a savings of time and resources. The Permissions Database 510 also includes a three-digit field representing a timer value 520. This timer value 520 is the predetermined amount of time that the call will be parked on the ACD. In other words, calls of different billing categories and types will be parked for different lengths of time, depending on the timer value 520 entered in the Permissions Database 510.

Although the above-described embodiment is the preferred embodiment, many modifications would be obvious to one skilled in the art. For instance, various criteria and databases could be used to determine which calls should be parked on the ACD.

While the present invention has been described with respect to a certain preferred embodiment, it should be understood that the invention is not limited to this particular embodiment, but, on the contrary, the invention is intended to cover all modifications, equivalents, and alternatives falling within the spirit and scope of the invention as defined by the appended claims.

What is claimed is:

1. A method for preventing in progress fraudulent telephone calls, comprising the steps of:
    determining whether a call is suspect based upon status of a call park flag that indicates a confidence level in fraudulent activity;
    parking the call if the status of the call park flag indicates the call is suspect;
    determining whether a billing number of the suspect call matches a billing number that is flagged as fraudulent; and
    tearing down the parked suspect call if the billing numbers match.

2. The method as recited in claim 1, wherein the call is parked in a call processing platform including an Intelligent Service Network (ISN) platform.

3. The method as recited in claim 1, wherein the calls are special service calls.

4. The method as recited in claim 1, further comprising:
    determining whether the call should enter call park logic according to a preliminary criteria.

5. The method as recited in claim 4, wherein the preliminary criteria is based on a billing category of call and a call type of call.

6. The method as recited in claim 5, wherein said billing categories and call types are stored in a permissions database.

7. The method as recited in claim 6, wherein the permissions database has predetermined amounts of time associated with billing categories, call types, and combinations of billing categories and call types, said predetermined amounts of time indicating the length of time the call will remain parked.

8. The method as recited in claim 4, wherein the call park logic utilizes a main criteria that is based on data concerning an originating leg of the call, a destination leg of the call, and exchanges on both legs of the call.

9. The method as recited in claim 1, wherein the call in the parking step is parked remains parked for a predetermined amount of time.

10. The method as claimed in claim 1, further comprising the step of:
    checking call park flags including the call park flag in records of a plurality of databases, said call park flags being set by a fraud analyst.

11. The method as recited in claim 10, wherein the plurality of databases comprise:
    an international country database having records associated with each international country, and having a first international country call park flag indicating a first level of confidence in fraudulent activity, and a second international country call park flag indicating a second level of confidence in fraudulent activity;
    an international city database having records associated with each international city, and having a first international city call park flag indicating a first level of confidence in fraudulent activity, and a second international city call park flag indicating a second level of confidence in fraudulent activity; and
    an exchange database having records associated with each telephone exchange, and having a call interrupt flag indicating a third level of confidence in fraudulent activity.

12. The method as recited in claim 11, wherein a first call leg of the call has the flag set to indicate a first level of confidence in fraudulent activity, a second call leg has a flag set to indicate a second level of confidence in fraudulent activity.

13. The method as recited in claim 1, wherein the call legs are parked at an Automatic Call Distributor (ACD).

14. The method as recited in claim 13, wherein the first call leg is an originating leg of the call is initially parked at a call processing platform, and the method further comprises the steps of:
    connecting the second call leg as a destination leg of the call; and
    parking both legs at the ACD.

15. The method as recited in claim 14, further comprising the step of:
    maintaining a record of the parked call at a Call Park Server (CPS), said record including the billing number.

16. The method as recited in claim 15, further comprising:
    checking a Billed Number Screening (BNS) database for fraudulent billing numbers; and
    sending a teardown request to the CPS when a new fraudulent billing number is added to the BNS; and
    finding a match between the fraudulent billing number in the teardown request and the billing numbers in the records of the CPS, wherein any calls in the ACD whose billing number matches the fraudulent billing number in the teardown request are torn down.

17. A system for preventing in progress fraudulent telephone calls, the system comprising:
    means for determining whether a call is suspect based upon status of a call park flag that indicates a confidence level in fraudulent activity;
    means for parking one or more legs of the call if the status of the call park flag indicates the call is suspect;
    means for determining whether a billing number of the suspect call matches a billing number that is flagged as fraudulent;
    means for tearing down the parked suspect call if the billing numbers match; and
    a call park database maintaining a record of the suspect call and the billing number of suspect call.

18. The system as recited in claim 17, wherein the parking means is an Automatic Call Distributor (ACD).

19. The system as recited in claim 17, further comprising:
    a monitoring means for monitoring the call, the monitoring means including one of an Automatic Response Unit (ARU) and a Manual Telecommunications Operator Console (MTOC).

20. The system as recited in claim 17, wherein the database is a Call Park Server (CPS).

21. The system as recited in claim 17, further comprising:
    a timer for tracking duration of a parked call according to a predetermined amount of time, wherein different categories of calls have different predetermined amounts of time.

22. The system as recited in claim 17, further comprising:

a permissions database for maintaining records that are used to determine whether the call is suspect, the records include billing categories, call types, and combinations of billing categories and call types.

23. The system as recited in claim 17, further comprising:

an International Country Code Database for maintaining records, each record comprising an International Country Code, an associated first International Country Call Park Flag (COUNTRY#1), and an associated second International Country Call Park Flag (COUNTRY #2);

an International City Code Database for maintaining records, each record comprising an International City Code, an associated first International City Call Park Flag (CITY#1), and an associated second International Country Call Park Flag (CITY#2); and an Exchange Master Database for maintaining records, each record comprising an exchange, and an associated Call Interrupt Flag (CALL INTERRUPT);

wherein the call is determined to be suspect based on a criteria, the criteria specifying a call with a leg having either COUNTRY#1 or CITY#1 flagged, a call with one leg having either COUNTRY#2 or CITY#2 flagged and an other leg with a flag flagged, and a call with one leg having CALL INTERRUPT flagged and an other leg with a COUNTRY or CITY flag flagged are parked at the parking means.

24. The system as recited in claim 17, further comprising:

a Billed Number Screening (BNS) database for maintaining records on fraudulent billing numbers;

a means for generating a teardown request when a fraudulent billing number has been added to the BNS; and a means for finding matches between the fraudulent billing number in a teardown request and the billing numbers in the records of the call park database.

25. A method for interrupting a call to prevent in progress fraud, comprising:

parking the call if the call is determined to be suspect based upon status of a call park flag that indicates a confidence level in fraudulent activity;

recording a fraudulent billing number during establishment of the call;

comparing a billing number associated with the suspect call to the recorded fraudulent billing number; and selectively tearing down the parked suspect call based upon the comparison step.

26. A server for preventing in progress fraudulent calls, comprising:

a database storing a billing number associated with an originating call leg and a destination call leg, the call legs being parked at an Automatic Call Distributor (ACD) based upon determining that a call corresponding to the call legs is suspect according to a plurality of call park flags statuses indicating respective confidence levels of fraudulent activity; and a processor configured to compare a received suspect billing number with the stored billing number, and to direct the ACD to tear down the call legs upon determining a match between the suspect billing number and the stored billing number.

* * * * *